United States Patent [19]

Sayles et al.

[11] Patent Number: 4,913,800

[45] Date of Patent: Apr. 3, 1990

[54] TEMPERATURE CONTROL IN AN EBULLATED BED REACTOR

[75] Inventors: Scott M. Sayles; William B. Livingston; MIchael P. Bellinger, all of Baton Rouge, La.

[73] Assignee: Texaco Inc., White Plains, N.Y.

[21] Appl. No.: 275,886

[22] Filed: Nov. 25, 1988

[51] Int. Cl.$^4$ .............................................. C10G 47/30
[52] U.S. Cl. ..................................... 208/108; 208/112; 208/157; 208/DIG. 1
[58] Field of Search ............... 208/48 AA, 48 Q, 112, 208/162, DIG. 1, 177, 157

[56] References Cited

U.S. PATENT DOCUMENTS

| | | | |
|---|---|---|---|
| 3,630,887 | 12/1971 | Mounce et al. | 208/48 Q |
| 3,681,231 | 8/1972 | Alpert et al. | 208/48 AA |
| 3,733,476 | 5/1973 | Hopkins et al. | 208/DIG. 1 |
| 3,841,981 | 10/1974 | Layng | 208/48 Q |
| 3,842,122 | 10/1974 | Wolk et al. | 208/48 Q |
| 3,981,793 | 9/1976 | Christie et al. | 208/108 |
| 4,354,852 | 10/1982 | Kydd | 208/DIG. 1 |
| 4,495,060 | 1/1985 | Abrams | 208/59 |
| 4,808,289 | 2/1989 | McDaniel et al. | 208/162 |
| 4,808,298 | 2/1989 | Peck et al. | 208/162 |
| 4,820,403 | 4/1989 | Gutberlet et al. | 208/68 |

*Primary Examiner*—Anthony McFarlane
*Attorney, Agent, or Firm*—Jack H. Park; Kenneth R. Priem; Richard A. Morgan

[57] ABSTRACT

A method has been discovered for controlling catalytic reactor bed temperature in an ebullated bed process. A sour, aromatic feedstock is mixed with a conventional ebullated bed residual oil feedstock in a controlled ratio. The aromatic feedstock is catalytically cracked and thereby releases heat. The flow rate of the aromatic feedstock is controlled to maintain the reactor bed at a selected catalytic reaction temperature.

Both feedstocks are upgraded to a fuel boiling range fraction and the fired heater is eliminated for the conventional feedstock and optionally for the hydrogen-containing gas feed stream as well.

7 Claims, 1 Drawing Sheet

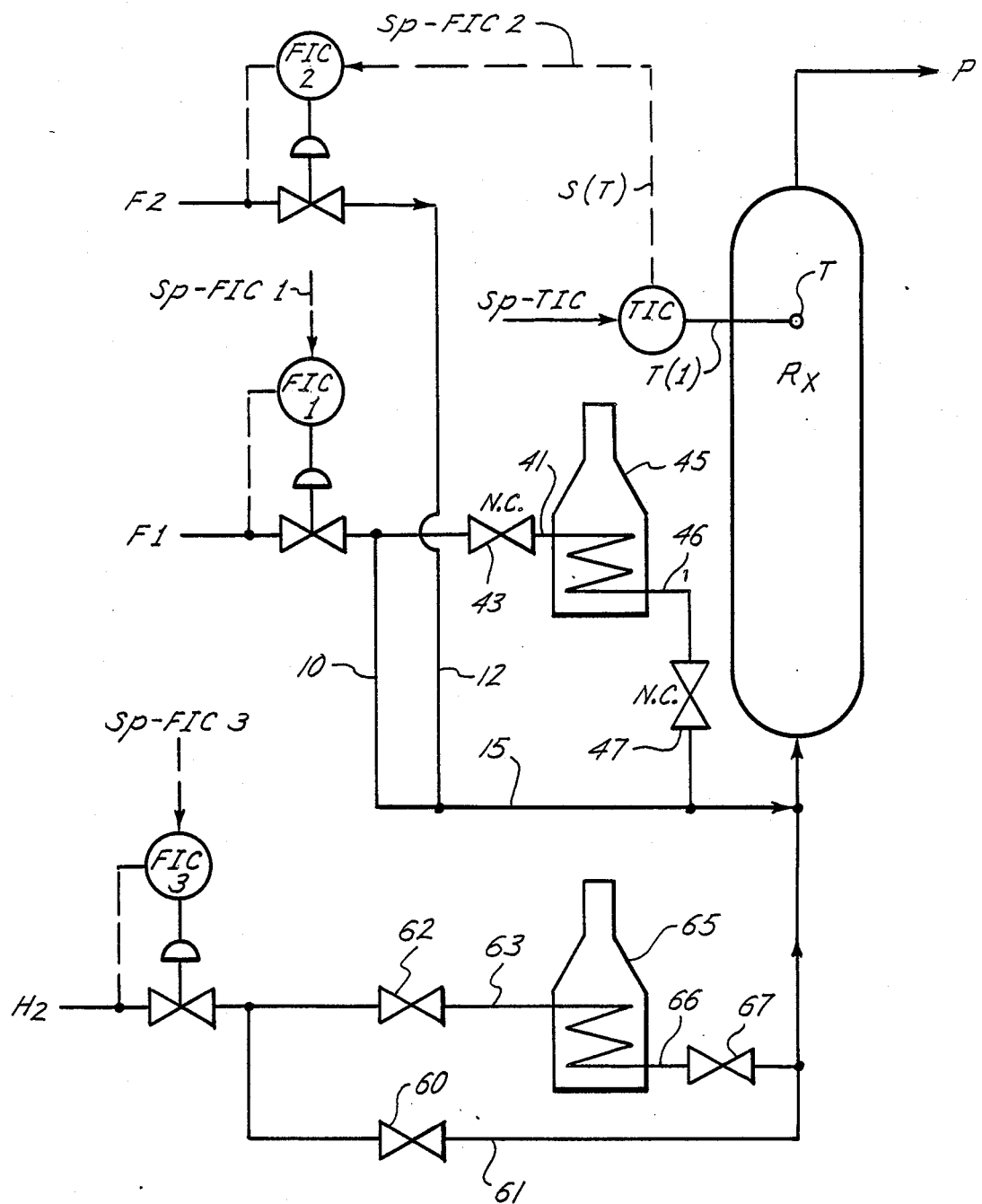

TEMPERATURE CONTROL IN AN EBULLATED BED REACTOR

BACKGROUND OF THE INVENTION

1. Field of the Invention

The invention relates to an improved method of controlling reactor temperature in the reactor of an ebullated bed process. More particularly, the invention relates to blending a residual hydrocarbon oil feedstock with an aromatic feedstock. Most particularly, the invention relates to adding the aromatic feedstock to the residual hydrocarbon oil feedstock at a rate whereby reactor temperature is maintained at a selected catalytic reaction temperature.

2. Description of Other Relevant Methods in the Field

The ebullated bed process comprises the passing of concurrently flowing streams of liquids or slurries of liquids and solids and gas through a vertically cylindrical vessel containing catalyst. The catalyst is placed in random motion in the liquid and has a gross volume dispersed through the liquid medium greater than the volume of the mass when stationary. This technology has found commercial application in the upgrading of heavy liquid hydrocarbons and converting coal to synthetic oils.

The process is generally described in U.S. Pat. No. Re. 25,770 to Johanson incorporated herein by reference. A mixture of hydrocarbon liquid and hydrogen is passed upwardly through a bed of catalyst particles at a rate such that the particles are forced into random motion as the liquid and gas pass upwardly through the bed. The catalyst bed motion is controlled by a recycle liquid flow so that at steady state, the bulk of the catalyst does not rise above a definable level in the reactor. Vapor along with the liquid which is being hydrogenated pass through that upper level of catalyst particles into a substantially catalyst free zone and are removed at the upper portion of the reactor.

In an ebullated bed process the substantial amounts of hydrogen gas and light hydrocarbon vapors present rise through the reaction zone into the catalyst free zone. Liquid is both recycled to the bottom of the reactor and removed from the reactor as product from this catalyst free zone. Vapor is separated from the liquid recycle stream before being passed through the recycle conduit to the recycle pump suction. The recycle pump (ebullation pump) maintains the expansion (ebullation) and random motion of catalyst particles at a constant and stable level.

U.S. Pat. No. 3,681,231 to S. B. Alpert et al teaches an ebullated bed process wherein a petroleum residuum feedstock containing at least 25 vol % boiling above 975° F. is blended with an aromatic diluent boiling within the range of 700° F. to 1000° F. and API gravity less than 16°. The aromatic diluent is blended in a ratio of 20 to 70 vol %, preferably 20 to 40 vol % diluent based on feed.

Aromatic diluents include decant oils from fluid catalytic cracking processes, syntower bottoms from Thermofor catalytic cracking operations, heavy coker gas oils, cycle oils from cracking operations and anthracene oil obtained from the destructive distillation of coal. It is stated that the 700° F. to 1000° F. gas oil generated in the process will in certain cases fall within the range of gravity and characterization factor and can serve as the aromatic feed diluent.

U.S. Pat. No. 3,412,010 to S. B. Alpert et al teaches an ebullated bed process wherein a petroleum residuum containing at least 25 vol % boiling above 975° F. is mixed with a recycle 680° F. to 975° F. fraction and passed to the ebullated reaction zone. It was found that the recycle of a 680° F. to 975° F. heavy gas oil resulted in a substantial lower yield of heavy gas oil in the 680° F. to 975° F. range and an increased yield of naphtha and furnace oil. Substantial improvement in operability was achieved as a result of reduction in asphaltenic precipitates.

U.S. Pat. No. 4,053,390 to L. C. James incorporated herein by reference teaches a start-up procedure for an ebullated bed process. In the procedure, a light oil is used to establish an ebullating bed. A heavy residual oil feedstock is incrementally substituted for the light oil. Hydrogen gas flow rate and ebullating pump speed are set to maintain ebullated bed expansion. In the incrementally changing feed stream, viscosity is controlled within ±10% and specific gravity controlled within ±5% to maintain a constant expansion of the ebullated bed, at a constant ebullating pump rate and gas flow rate.

U.S. Pat. No. 3,668,116 to C. E. Adams et al incorporated herein by reference teaches an ebullated bed process wherein the catalyst contains the oxide or sulfide of a Group VIB metal and the oxide or sulfide or a Group VIII metal deposited on a support of silica-stabilized alumina. In the drawing a resid feedstock furnace and a make-up hydrogen furnace are shown to be conventional.

BRIEF DESCRIPTION OF THE DRAWING

The drawing is a schematic representation of a control system to facilitate a method for controlling temperature in an ebullated bed process at catalytic reaction temperatures in the absence of indirect heating, such as by a fired furnace.

DETAILED DESCRIPTION OF THE DRAWING

A first feedstock (F1) such as a vacuum residuum derived from a Saudi Arabian crude is passed via flow rate indicator and controller (FIC 1) through transfer line 10 along with a hydrogen-containing gas (H2) upwardly through an ebullated bed of catalyst (Rx) in a hydrocracking zone at a temperature of 650° F. to 950° F. and a hydrogen partial pressure in the range of 1000 psia to 5000 psia to yield a hydrocracked product (P).

A second feedstock (F2) comprises a heavy cycle gas oil fraction derived from the fluid catalytic cracking of naphtha, nominally boiling in the range of 650° F. to 1000° F., API gravity −2.5° to 3.1° with about 95 vol % aromatics and about 3 wt % sulfur in composition. Second feedstock (F2) is passed via flow rate indicator and controller (FIC 2) through transfer line 12 to transfer line 15 where it superficially mixes with first feedstock (F1) and is passed to the ebullated bed of catalyst (Rx).

Second feedstock (F2) is cracked in ebullated bed (Rx) and because of its high aromatics and sulfur content produces sufficient heat to maintain the hydrocracking zone at a catalytic reaction temperature, e.g. 650° F. to 950° F.

The temperature (T(1)) of the ebullated bed (Rx) is measured by a thermocouple (T). In the alternative, temperature along the bed can be measured by a series of thermocouples (T) the temperature values from which are averaged to yield an average ebullated bed temperature (T(1)). Bed temperature (T(1)) is indicated on a temperature indicator and controller (TIC) and produces a signal (S(T)) corresponding to the difference between the measured temperature (T(1)) and the required temperature indicated as setpoint (Sp-TIC) on temperature indicator and controller (TIC). This signal (S(T)) is the setpoint signal (Sp-FIC 2) for flow rate indicator and controller (FIC 2) which controls the flow rate of second feedstock (F2), the heat yielding feedstock, to the ebullated bed of catalyst (Rx). In the alternative, signal (S(T)) is the setpoint signal (Sp-FIC 3) for the flow rate indicator and controller (FIC 3) which controls the flow rate of hydrogen-containing gas (H2), to the ebullated bed of catalyst (Rx).

The control system comprising thermocouple (T) temperature indicator and controller (TIC) and flow rate indicator and controller (FIC 2) comprises a feedback control loop in combination with the associated control valves and piping. At steady state, the incremental changes to the process this feedback control loop make are well understood in the art, once the invention is revealed.

It is of particular note, that all of both first feedstock (F1) and second feedstock (F2) bypasses fired heater 45. Bypass is accomplished by means of block valve 43 which is representative of double block valves and bleeder. Block valve (43) prevents flow of first feedstock (F1) through transfer line (41) to fired heater (45). Block valve (47) prevents back flow through transfer line (46). Block valves (43 and 47) are normally closed (N.C.) preventing flow during the practice of this inventive method.

Fired heater 45 is used only during start-up to initially achieve catalytic reaction temperature and during shutdown.

Hydrogen-containing gas (H2) is flow controlled by flow rate indicator and controller 3 (FIC 3) by one of two piping schemes. In Example 2, the feed comprises 25 vol % heavy cycle gas oil (HCGO). Block valve 60 is closed, preventing flow through transfer line 61. Block valves 62 and 67 are open, allowing flow through transfer line 63 to fired heater 65, out transfer line 66 to the ebullated bed of catalyst (Rx).

In Example 3, the feed comprises 45 vol % heavy cycle gas oil (HCGO). Block valves 62 and 67 are closed. Block valve 60 is open and hydrogen-containing gas (H2) flows via transfer line 61 to the reactor bed (Rx).

Conventional feedstocks (F1) for the ebullated bed process include residuum such as petroleum atmospheric residuum, vacuum distillation bottoms, deasphalter bottoms, shale oil, shale oil residues, tar sands, bitumen, coal derived hydrocarbons, hydrocarbon residues and mixtures thereof.

Suitable second feedstocks (F2) for practicing the inventive method include any of the sour and highly aromatic refinery streams which can be upgraded to a fuel boiling range and lighter fraction by the ebullated bed process. This may include decant oils from the fluid catalytic cracking process, syntower bottoms from Thermoform catalytic cracking operations, heavy coker gas oils, cycle oils from cracking operations and anthracene oil obtained from the destructive distillation of coal. These oils typically have a nominal boiling range of 650° F. to 1000° F. In general, these fractions are only limited to petroleum derived fractions susceptible to hydrocracking at temperatures of 650° F. to 950° F. and hydrogen partial pressures of 1000 psia to 5000 psia and of sufficient aromaticity to yield at these conditions sufficient heat when mixed with the first feedstock (F1) to eliminate the need for additional indirect heating, for example by fired heater (45). In Example 3, it is shown that if a sufficient amount of second feedstock (F2) is used, a fired heater on the make-up hydrogen can be eliminated. Preferred fractions comprise of at least 70 wt % aromatics and 1 wt % sulfur with a typical API gravity of −5° to 3°. Fractions comprising 50 wt % to 70 wt % aromatics and sulfur of 1 wt % to 10 wt % and of API gravity 3° to 6° may be used as well.

This invention is shown by way of Example.

EXAMPLE

In a two stage ebullated bed process a feedstock comprising 12.5 vol % heavy cycle gas oil was fed to the reactors in series. The heavy cycle gas oil is typically 80 to 95 vol % aromatic, at least 80 to 90 vol % boils nominally in the range of 650° F. to 1000° F. and has an API gravity of −2.5° to 3.1°. The heavy cycle gas oil gave a 121° F. temperature for 12.5 vol % in the feed. The result is reported as Example 1 (Ex. 1).

From Example 1, simulated Example 2 demonstrated that the fired heater on the hydrogen could be eliminated with a feedstock comprising 25 vol % heavy cycle gas oil. Simulated Example 3 demonstrated that both the feedstock and feed hydrogen heaters could be eliminated with a 45 vol % heavy cycle gas oil feed.

|  | Ex. 1<br>12.5 vol %<br>HCGO | Ex. 2<br>25 vol %<br>HCGO | Ex. 3<br>45 vol %<br>HCGO |
|---|---|---|---|
| Reactor temp. diff., R2-R1, °F. | 12 | 12 | 12 |
| Fresh Feed, bbl/hr | 1048 | 1040 | 578 |
| API Gravity | 5.5° | 5.5° | 5.5° |
| H2 Rich Gas, MMSCFH | 3.186 | 3.18 | 3.09 |
| MW, lb/mol | 3.57 | 3.57 | 3.57 |
| 1st Reactor - R1 Average Temp, °F. | 806 | 806 | 806 |
| Exotherm, °F. | | | |
| Measured | 121 | — | — |
| Calculated | 119 | 164 | 211 |
| Inlet Temp, °F. | 687 | 642 | 595 |
| H2 Heater Out Temp, °F. | 1000 | 750 | 750 |
| Feed Heater Out Temp, °F. | | | |
| Calculated | 578 | 605 | 500 |
| Measured | 560 | — | — |
| Increased H2 Consumed MSCFH | 167 | 332 | 406 |
| Bbls of vacuum resid to R2 | — | 137 | 600 |

R1 First reactor in series
R2 Second reactor in series
HCGO - Heavy cycle gas oil, API −2°; Sulfur 3.7 wt %, distillation (ASTM D-1160) IBP 650° F. 80% pt 1000° F.

While particular embodiments of the invention have been described, it will be understood, of course, that the invention is not limited thereto since many modifications may be made, and it is, therefore, contemplated to cover by the appended claims any such modifications as fall within the true spirit and scope of the invention.

What is claimed is:

1. In a continuous process for treating a residual hydrocarbon oil with a hydrogen-containing gas at elevated catalytic reaction temperature and pressure in the presence of a bed of particulate solid catalyst, said process comprising introducing the hydrogen-containing gas and residual hydrocarbon oil into the lower end of a generally vertical catalyst containing reaction vessel wherein the catalyst is placed in random motion within the fluid hydrocarbon whereby the catalyst bed is expanded to a volume greater than its static volume, wherein the improvement comprises:

adding an aromatic feedstock into the lower end of the reaction vessel at a rate whereby said temperature is controlled in the range of 650° F. to 950° F. in the absence of heating said hydrogen-containing gas, said residual hydrocarbon oil and said aromatic feedstock by indirect heat exchange.

2. The process of claim 1 wherein the aromatic feedstock is a heavy cycle gas oil.

3. The process of claim 1 wherein the aromatic feedstock controls temperature by means of feedback control.

4. The process of claim 1 wherein the aromatic feedstock is 70 vol % to 95 vol % aromatic.

5. The process of claim 1 wherein the aromatic feedstock comprises 1 wt % to 10 wt % sulfur.

6. The process of claim 1 wherein the aromatic feedstock comprises 2 wt % to 4 wt % sulfur.

7. The process of claim 1 wherein the aromatic feedstock is an admixture with said residual hydrocarbon oil.

* * * * *